US006771032B2

(12) United States Patent
Cox-Smith et al.

(10) Patent No.: US 6,771,032 B2
(45) Date of Patent: Aug. 3, 2004

(54) MOTOR CONTROL SYSTEM

(75) Inventors: Peter John Cox-Smith, Leighton Buzzard (GB); Paul Anthony Kendall, Pudsey (GB); David Owen Sandells, Wolverhampton (GB)

(73) Assignee: Lucas Industries Limited, Solihull (GB)

( * ) Notice: Subject to any disclaimer, the term of this patent is extended or adjusted under 35 U.S.C. 154(b) by 0 days.

(21) Appl. No.: 10/196,375

(22) Filed: Jul. 17, 2002

(65) Prior Publication Data

US 2003/0015982 A1 Jan. 23, 2003

(30) Foreign Application Priority Data

Jul. 23, 2001 (GB) .............................. 0117904

(51) Int. Cl.[7] .......................... H02P 5/46; G05B 19/02; F02K 1/54

(52) U.S. Cl. ...................... 318/85; 318/163; 318/434; 318/433; 388/904; 60/226.2; 60/230; 244/110 B

(58) Field of Search .................... 318/85, 59, 68, 318/77, 163, 798, 806, 268, 434, 433; 388/904; 60/226.2, 230; 244/110 B

(56) References Cited

U.S. PATENT DOCUMENTS

| | | | | |
|---|---|---|---|---|
| 4,489,259 A | * | 12/1984 | White et al. ................ | 318/696 |
| 4,491,776 A | * | 1/1985 | Veale .......................... | 318/561 |
| 5,062,265 A | * | 11/1991 | Markunas .................... | 60/450 |
| 5,132,855 A | * | 7/1992 | Waugh et al. ............ | 360/78.07 |
| 5,711,697 A | * | 1/1998 | Taninaga et al. ............ | 318/560 |
| 5,804,941 A | * | 9/1998 | Ray .......................... | 318/569 |
| 5,960,626 A | * | 10/1999 | Baudu et al. ............... | 60/226.2 |
| 6,195,601 B1 | * | 2/2001 | Spillner et al. ............... | 701/41 |
| 6,346,788 B1 | * | 2/2002 | Nagai et al. ................ | 318/432 |
| 6,397,798 B1 | * | 6/2002 | Fiaccabrino ............. | 123/90.11 |

FOREIGN PATENT DOCUMENTS

| | | | | |
|---|---|---|---|---|
| DE | 19820381 A1 | * | 11/1999 | ............ B62D/5/06 |
| JP | 61208519 A | * | 9/1986 | ............ G05D/3/12 |
| JP | 05083985 A | * | 4/1993 | ............ H02P/7/00 |

* cited by examiner

Primary Examiner—Shih-Yung Hsieh
Assistant Examiner—Edgardo San Martin
(74) Attorney, Agent, or Firm—Hunton & Williams LLP

(57) ABSTRACT

A motor control system is provided for controlling at least one motor driven mechanical actuator. The control system drives the motor according to a function of the actuator position. The system is further arranged to modify the motor speed to ensure that a predetermined power limit is not exceeded.

27 Claims, 4 Drawing Sheets

MOTOR CONTROL SYSTEM

The present invention relates to a motor control system for controlling at least one electric motor, an electric thrust reverser control system including such a motor control system and a method of controlling an electric motor.

BACKGROUND

Electric motors are used in a wide and varied range of applications, many of which require the electric motors to be controlled to a varying degree. The operating parameters of the motor that may be controlled include the speed of the electric motor, the torque produced by the electric motor, and the power drawn by the electric motor. Any one or more of these parameters may be controlled and it will be appreciated that this list of parameters is not exhaustive.

One application in which such motor control is required is in electric thrust reverser control systems for aircraft jet engines. Thrust reversers are employed on aircraft jet engines during landing to ensure that the aircraft is slowed quickly. In one design, they operate by deploying cowls which deflect air from the engine, thus providing reverse thrust. It is well known to operate these cowls by the use of a hydraulic control system. Such hydraulic systems require high hydraulic power to be tapped from the hydraulic circuit of the aircraft. The use of this hydraulic fluid creates maintenance problems and the location of the hydraulic lines in the vicinity of the fan in the jet engine requires additional protection of the associated hydraulic equipment. The compactness of the engine components makes locating the hydraulic plumbing particularly difficult.

U.S. Pat. No. 6,195,601 discloses a vehicle power assisted steering system. The system seeks to control the speed of an electric motor driving a hydraulic pump by measuring the current drawn by the motor, measuring the speed of the motor, and then comparing in a look up table the target speed for the motor based on the current drawn by the motor, and then correcting the motor speed to attain the target speed.

It has been suggested in U.S. Pat. No. 5,960,626 to use electric motors to operate the thrust reverser mechanism. A synchronising mechanism is employed, as described at column 4 lines 20 to 31. However, it is also suggested that actuator synchronisation may also be "implemented by electronically controlling the motor speed of the linear actuator, and/or the displacement of the movable part of the linear actuator. The linear actuator may also have an electric motor . . . ".

SUMMARY OF THE INVENTION

By using one or more electric motors to operate the thrust reverser cowls the problems associated with hydraulic control systems are avoided. In a thrust reverser system it is strongly preferred that the cowls are deployed and retracted in a synchronised fashion. Such synchronisation avoids the possibility of a jam occurring in any mechanism linking the thrust reverser cowls. To achieve this in an electrical system each motor is driven to follow a predetermined speed profile. However, under extreme conditions, such as during an aborted landing or an aborted take-off, higher loads are placed on the electric motors actuating the reverser cowls. In such extreme conditions the power required by the motor can peak to a high value, for example 30 kW, whilst ordinarily a less powerful motor, for example 15 kW, would be adequate. For aerospace applications a smaller motor offers significant weight advantages to a system.

It would therefore be advantageous to provide a motor control system that prevents the power required by an electric motor from exceeding a set value.

A possible solution is to apply a power limit at the drive stage of the motor, but this has been found to be particularly difficult to implement as motor characteristics, for example the winding resistances, vary with temperature, and therefore such a power limit would have to take these variations into account.

If during deployment or retraction, at least one of the motors reaches its power limit, it will become necessary to synchronise the motors by limiting to the slowest actuator speed.

According to a first aspect of the present invention there is provided a motor control system for controlling at least one electric motor driven mechanical actuator, said motor control system being arranged to drive at least one electric motor according to a predetermined motor speed profile which varies the motor speed as a function of position of the at least one mechanical actuator, wherein said motor control system is further arranged to modify said motor speed profile during operation of said at least one electric motor to ensure that a predetermined motor power demand is not exceeded.

Preferably the motor speed profile is modified as a function of the load acting on the at least one electric motor.

Preferably the motor speed profile comprises a motor speed versus actuator position profile. Preferably an actuator position demand signal is generated in accordance with the speed profile.

Preferably the target motor speed is a function of actuator position.

It is preferred that the motor speed profile is modified by modifying the actuator position demand signal.

Additionally, the motor control system may comprise an actuator position feedback loop arranged to generate a motor control signal in accordance with a function of a received actuator position signal and said actuator position demand signal.

Additionally or alternatively, the motor control system may further comprise actuator synchronisation means arranged to substantially synchronise the relative positions of two or more of said actuators. Preferably the actuator synchronisation means is arranged to further modify the motor speed profile.

Preferably the predetermined motor power demand is substantially equal to the maximum rated power of the at least one electric motor. Additionally or alternatively, the motor speed profile may be stored in a permanent memory store or maybe selected from a plurality of alternative motor speed profiles and stored in a temporary memory store.

Preferably an estimate of the load being supplied by the motor is derived from the torque being supplied by the motor and the rate of rotation of the motor.

The present invention utilises the knowledge that (at least in an ideal motor) torque is proportional to the current in the motor windings. Thus the need to include mechanical torque sensing devices is avoided as the data necessary to implement power regulation can be derived by simple measurement of motor current and motor speed.

According to a second aspect of the present invention there is provided a method of controlling an electric motor comprising supplying drive signals to said electric motor in accordance with a predetermined motor speed profile, monitoring the power demand of said electric motor, and modifying said motor speed profile to ensure that a predetermined motor power demand is not exceeded.

Preferably the motor speed profile comprises a motor speed versus actuator position profile, the actuator being driven by said electric motor. Additionally, the method may further comprise generating an actuator position demand signal in accordance with said motor speed profile. Additionally, the motor speed profile may be modified by modifying said actuator position demand signal.

According to a third aspect of the present invention there is provided an electric thrust reverser control system for controlling the actuation of at least one thrust reverser cowl comprising at least one electric motor for actuating said thrust reverser cowl and a motor control system according to the first aspect of the present invention.

Preferably at least two thrust reverser cowls are provided, each actuated by at least one electric motor. Additionally, the two thrust reverser cowls may be synchronised with regards to their relative positions. The synchronisation may be achieved by monitoring the relative motion of the thrust reverser cowls during deployment or stowage, and, if one moves ahead of another, the amount of power to that reverser may be reduced so that it slows down, thereby allowing the or each other thrust reverser to obtain the same position.

BRIEF DESCRIPTION OF THE DRAWINGS

An embodiment of the present invention will now be described, by way of example, with reference to the accompanying drawings, in which.

DETAILED DESCRIPTION OF THE EMBODIMENTS

Figure 1:
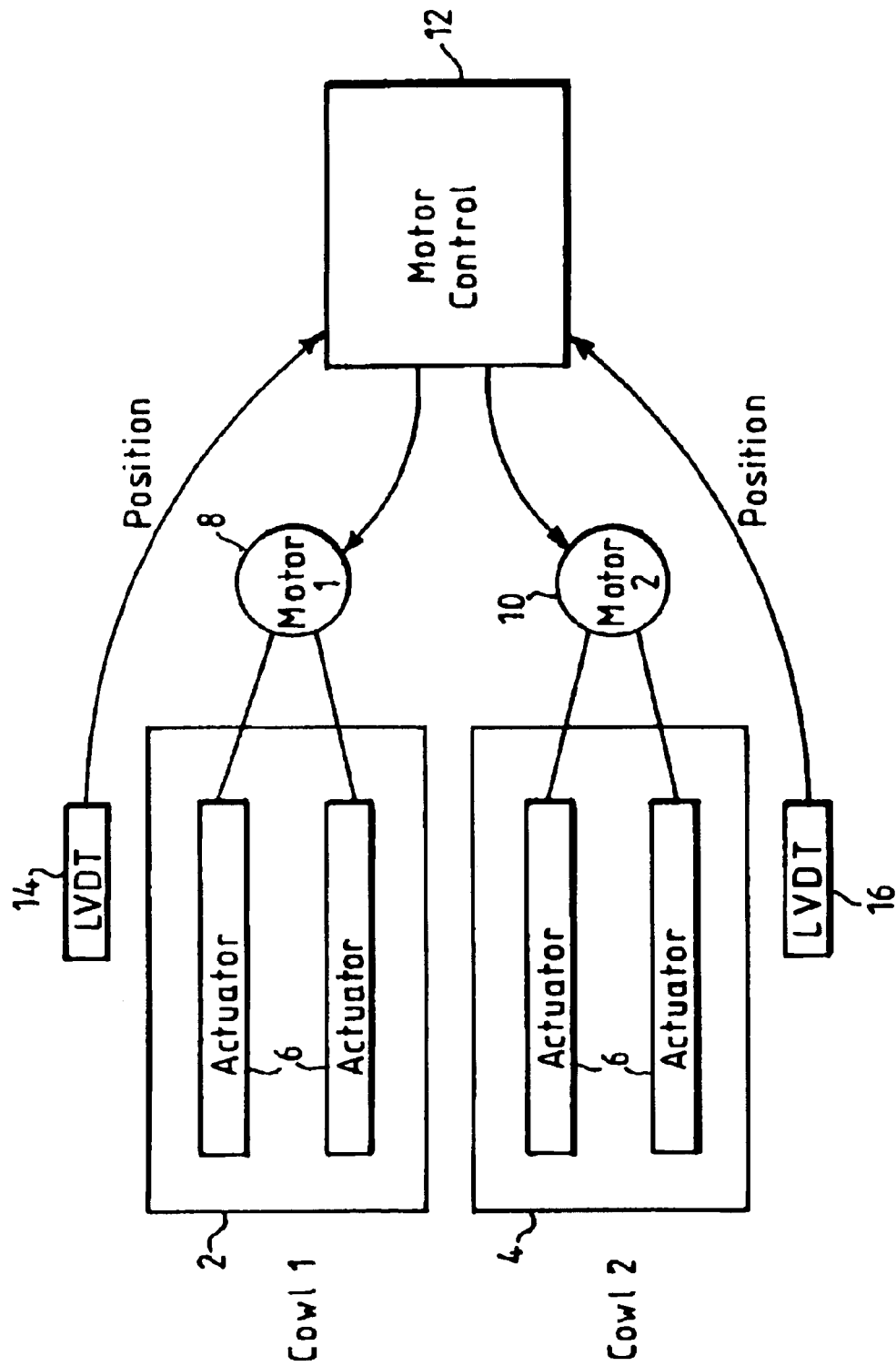
FIG. 1 is a block diagram showing the configuration of an electrically operated thrust reverser actuation system including a motor controller according to the present invention.

FIG. 1 shows the general configuration of a electrically operated thrust reverser actuation system including a motor control system according to the present invention. In the system described two thrust reverser cowls are provided per engine. Only the cowls shown for one engine are shown in FIG. 1 for the sake of clarity. Each cowl, "cowl 1" and "cowl 2" (labelled with reference numbers 2 and 4 respectively) are provided with two actuators 6 that cause the cowls to move between the deployed and stowed positions. The actuators 6 for cowl 1 are driven by a first motor 8, whilst the actuators 6 for cowl 2 are driven by a second motor 10. Each motor is controlled from a motor control system 12. The position of cowl 1 is monitored using a LVDT (linear variable differentia transformer) 14 that provides a position signal to the motor control system 12. Similarly, a second LVDT 16 provides position feedback from the second cowl 4 to the motor control system 12.

As previously mentioned it is important that the cowls are deployed and retracted in a synchronised fashion. To do this, the first motor 8 and second motor 10 are driven by the motor control system 12 in accordance with a set speed profile. The speed profile is shown by the solid line in FIG. 2. As can be seen, the speed of the cowl is initially ramped to a maximum speed. This maximum speed is then maintained until the motor control system 12 determines, from the position signals provided from the first and second LVDT's, that the thruster cowls have reached a particular position that corresponds to being substantially (i.e. nearly) either fully deployed or retracted. Having reached this position, indicated by the letter A marked on the speed position profile of FIG. 2, the speed of the first and second motors 8 and 10 is reduced, for example in a ramped manner, to a "snubbing" speed at which the actuators 6 are allowed to strike against their end stops without fear of damage. The motor control system 12 modifies the speed of one or more of the motors to obtain synchronisation between the thruster cowls. The fastest cowl is slowed to match the speed of the slowest.

Figure 2:
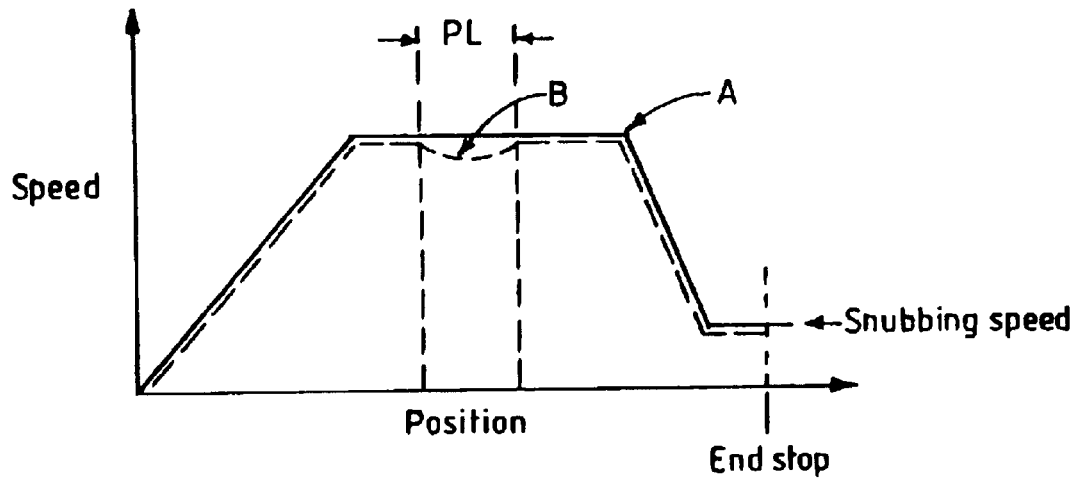
FIG. 2 shows a motor speed profile suitable for use with the thrust reverser system shown in FIG. 1.

Under normal conditions the motor control system 12 ensures that the first and second motors 8 and 10 adhere to the speed profiles shown in FIG. 2 by varying the motor current, which is proportional to motor torque, in response to variations in the load exerted on the cowls 2, 4 and thus the motors 8, 10. The power requirement of the motors 8, 10 therefore varies but under normal conditions the power variation never exceeds the rated power of the motors 8, 10.

However, under extreme conditions such as an aborted landing, where it is required to stow the thrust reverser cowls whilst the engine is still producing considerable thrust, or an aborted take-off, where the thrust reverser cowls are deployed whilst the engines are producing considerable forward thrust, much higher loads are exerted on the actuator motors 8, 10. To meet the increased power demand caused by the increased loads whilst still maintaining the speed profile shown in FIG. 2 would cause the motors 8, 10 to exceed their power rating. The motor control system 12 therefore modifies the speed profile by reducing the speed of the actuator motors 8, 10 by a sufficient amount such that the power demand does not exceed the maximum power rating of the motor. The power demand of each motor is the product of motor speed and motor torque and consequently is monitored as a function of motor speed and motor current, which is proportional to torque, and is used to modify the speed profile as required. The effect of this can be seen by looking at the example indicated by the chain line in FIG. 2. Here an increased load on the motor gives rise to the need to limit the power supplied by the motor in order to keep power consumption within acceptable limits for the motor within the range indicated "PL". This in turn gives rise to a reduction in deployment speed, as shown by the curved portion labelled B of the chain line. In this case the transition between stowed and deployed takes longer. The effect of modifying the speed profile is shown further in FIG. 3.

Figure 3:
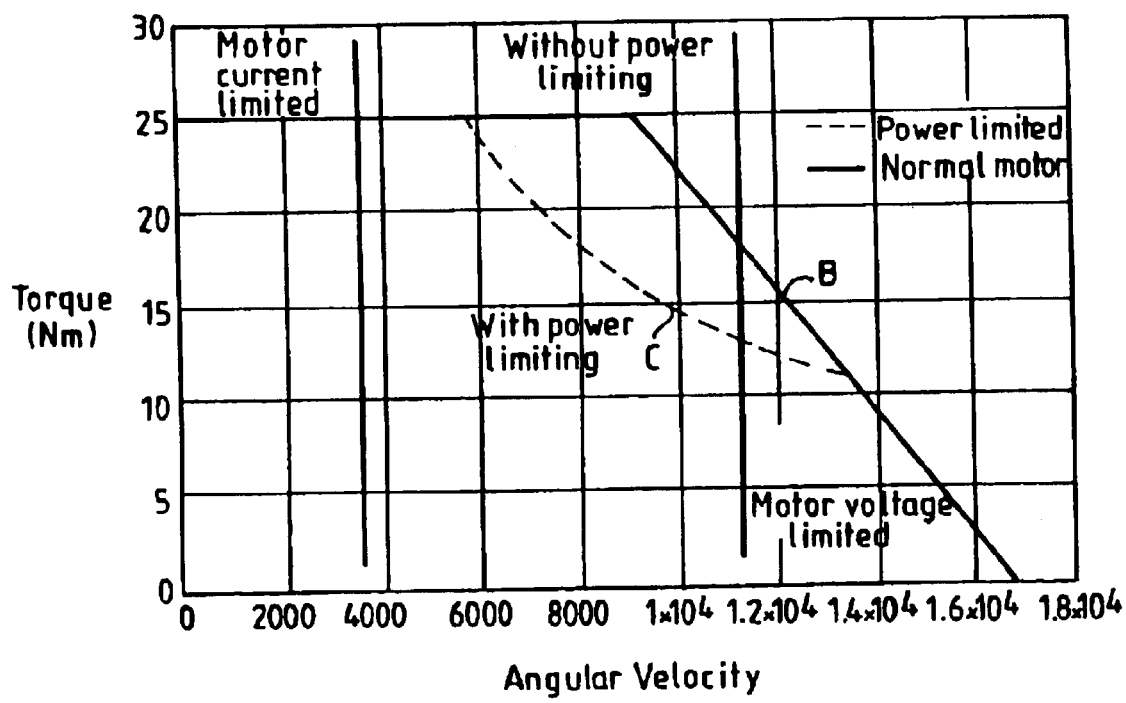
FIG. 3 shows a torque/speed profile for a motor control in accordance with the present invention.

The torque generated by the motor is plotted against the vertical axis (ordinate) whilst the angular velocity of the motor is plotted against the horizontal axis (abscissa). The power required by a motor without the use of power limiting in accordance with the present invention is shown by the solid line marked B on FIG. 3. In contrast, the power requirement of a motor utilising the motor control system of the present invention is shown by the chained line marked C on FIG. 3. FIG. 3 shows that by modifying the speed profile the motor control system 12 maintains the actuator motors 8, 10 within a constant power (torque/speed) relationship.

Figure 4:
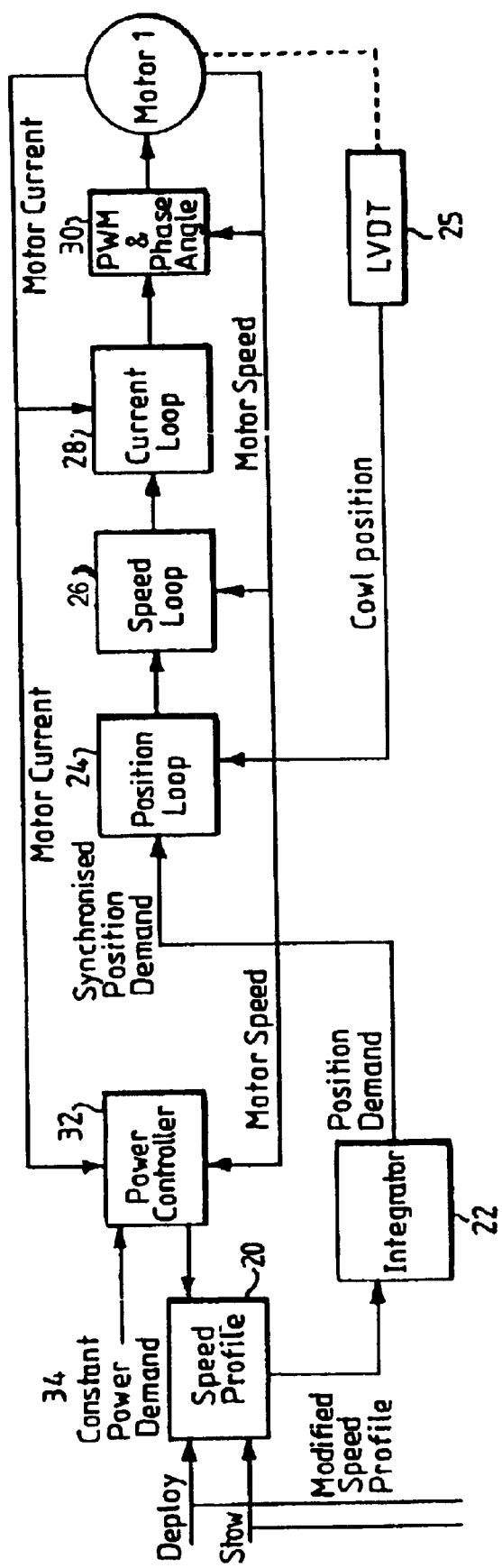
FIG. 4 is a block diagram of the basic control loop of the motor control system of the present invention.

The basic control loop of a motor control system 12 constituting an embodiment of the present invention for controlling a signal motor and cowl is shown in FIG. 4. On receipt of a deploy or stow signal a stored speed versus position profile 20 is accessed to generate a motor speed demand signal to the motor control loop. The demanded speed signal is integrated at an integrator 22 to form a position demand signal that is then supplied to a position control loop unit 24. The position control loop 24 also receives a cowl position signal from the LVDT 25 associated with the cowl. A speed loop unit 26 is provided after the position loop unit 24 to provide damping to the position loop performance. The speed loop derives speed feedback information from hall effect sensors mounted in the motor. The hall sensors are already provided for commutation control of the motor and provide a discontinuous speed measurement that is available at intervals determined by the motor velocity itself. The speed loop is not used at low motor speed. A current loop unit 28 is used to convert the position/speed demands into a motor current demand and is based on a high bandwidth analogue PI (proportional integral) controller and includes a programmable current limit to set the stall torque. The motor current demand is fed to a pulse width modulation (PWM) and phase angle control loop 30 that directly controls the motor drive phase switching.

In normal operation the system will closely follow the speed/position profile as its deploys and stows the thrust reverser cowls. During an aborted take-off deploy or aborted landing stow the speed profile will be modified by the power controller 32 that monitors both motor current and motor speed and modifies the speed profile 20 to ensure that a constant power demand 34 is not exceeded.

Although the use of a motor control system according to the present invention in a thrust reverser actuation system increases the deploy and stow times under extreme conditions, these increases are considered to be within acceptable limits and thus allows smaller motors to be utilised that offer a significant weight advantage to the overall system.

Figure 5:
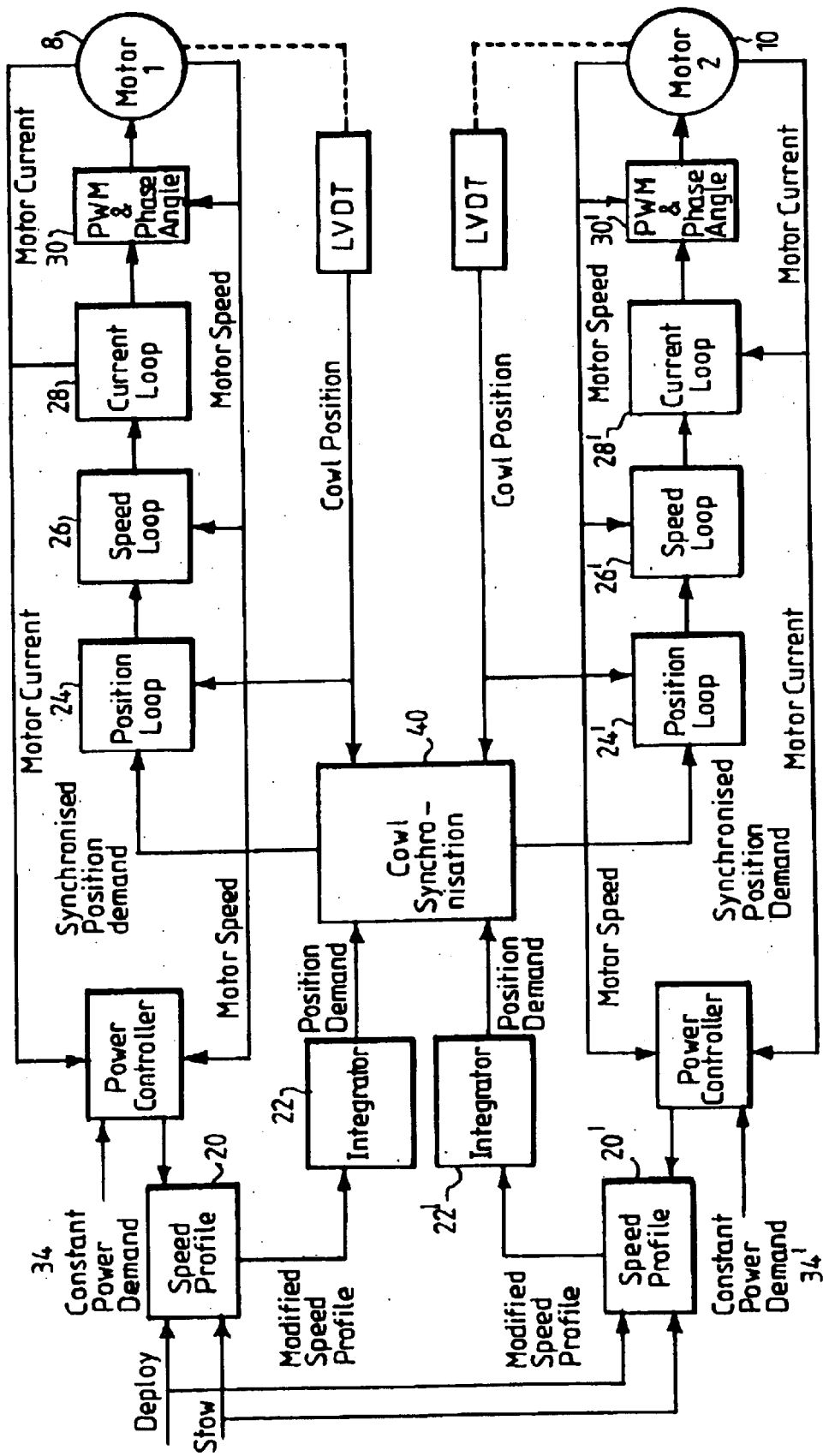
FIG. 5 is a block diagram of the basic control loop of the motor control system of the present invention for use in a synchronised motor system.

FIG. 5 illustrates the basic control loop of a motor control system according to the present invention that further provides synchronisation between two reverser thrust cowls. Each cowl, not shown, is actuated by individual motors 8, 10. Each motor has an identical control loop associated with it, each control loop being substantially the same as that shown in FIG. 4. However, a cowl synchronisation block 40 is provided that receives the cowl position signals from each LVDT associated with the respective cowls. The cowl synchronisation block uses this position feedback information to determine the position difference between the two cowls and modifies the position demand signal received from the respective integrators 22 and 22' to ensure that the individual cowls remain within the required synchronisation limits. Otherwise, the operation of the control loop is as described with reference to FIG. 4.

It will be appreciated that although described in conjunction with an electric thrust reverser control system, the motor control system of the present invention may be used in any application where the power demand of one or more electric motors is required to be limited.

What is claimed is:

1. A motor control system for controlling at least one motor driven mechanical actuator, said motor control system being arranged to drive at least one electric motor according to a predetermined motor speed profile which varies the motor speed as a function of position of the at least one actuator driven by the motor, wherein said motor control system is further arranged to modify said motor speed versus actuator position profile during operation of said at least one electric motor to ensure that a predetermined motor power demand is not exceeded.

2. A motor control system according to claim 1, wherein the motor speed profile is modified as a function of the load acting on the least one electric motor.

3. A motor control system according to claim 2, wherein an estimate of said load is derived from the torque being supplied by the motor and the rate of rotation of the motor.

4. A motor control system according to claim 3, wherein said torque is proportional to the motor current being drawn by said motor.

5. A motor control system according to claim 1, wherein the motor power demand is monitored as a function of motor current and motor speed.

6. A motor control system according to claim 1, wherein an actuator position demand signal is generated as a function of said motor speed profile.

7. A motor control system according to claim 6, wherein the motor speed is modified by modifying said actuator position demand signal.

8. A motor control system according to claim 6, comprising an actuator position feedback loop arranged to generate a motor control signal in accordance with a received actuator position signal and said actuator position demand signal.

9. A motor control system according to claim 1, wherein a target motor speed is a function of the actuator position.

10. A motor control system according to claim 1, further comprising an actuator synchroniser arranged to substantially synchronise the relative positions of two or more of said actuators.

11. A motor control system according to claim 10, wherein said actuator synchroniser is arranged to further modify said motor speed.

12. A motor control system according to claim 1, wherein said predetermined motor power demand is substantially equal to the maximum rated power of said at least one electric motor.

13. An electric thrust reverser control system for controlling the operation of at least one thrust reverser cowl comprising at least one electric motor for actuating said thrust reverser cowl and a motor control system for controlling at least one motor driven mechanical actuator, said motor control system being arranged to drive at least one electric motor according to a predetermined motor speed profile which varies the motor speed as a function of position of the at least one actuator driven by the motor, wherein said motor control system is further arranged to modify said motor speed versus actuator position profile during operation of said at least one electric motor to ensure that a predetermined motor power demand is not exceeded.

14. An electric thrust reverser control system for controlling the operation of at least one thrust reverser of an aircraft gas turbine engine, wherein an electric motor is provided for operating said thrust reverser, wherein the control system is arranged to drive the electric motor at a speed which is a function of the position of the thrust reverser, and wherein the control system is further arranged to reduce said motor speed during operation to ensure that a predetermined motor power demand limit is not exceeded.

15. An electric thrust reverser control system as claimed in claim 14, wherein a plurality of thrust reversers are provided and a plurality of motors are provided for operating said thrust reversers, and the control system further comprises a synchroniser for modifying motor speeds of the motors to electrically maintain positional synchronisation of thrust reverser positions.

16. A method of controlling an electric motor comprising:
  supplying drive signals to said electric motor in accordance with a predetermined motor speed profile, wherein the motor speed varies as a function of the position of an actuator driven by the motor;
  monitoring the power demand of said electric motor; and modifying said motor speed versus actuator position profile to ensure that a predetermined motor power demand is not exceeded.

17. A method of controlling an electric motor according to claim 16, further comprising generating an actuator position demand signal in accordance with said motor speed profile.

18. A method of controlling an electric motor according to claim 17, wherein said motor speed profile is modified by modifying said actuator position demand signal.

19. A motor control system for controlling at least one motor driven mechanical actuator in a thrust reverser, said motor control system being arranged to drive at least one electric motor according to a predetermined motor speed profile which varies the motor speed as a function of position of the at least one actuator driven by the motor, wherein said motor control system is further arranged to modify said motor speed profile during operation of said at least one electric motor to ensure that a predetermined motor power demand is not exceeded, and wherein an actuator position demand signal is generated as a function of said motor speed profile.

20. A motor control system according to claim 19, wherein the motor speed profile is modified as a function of the load acting on the least one electric motor, and wherein an estimate of said load is derived from the torque being supplied by the motor and the rate of rotation of the motor.

21. A motor control system according to claim 20, wherein said torque is proportional to the motor current being drawn by said motor.

22. A motor control system according to claim 19, wherein the motor power demand is monitored as a function of motor current and motor speed.

23. A motor control system according to claim 19, wherein the motor speed is modified by modifying said actuator position demand signal.

24. A motor control system according to claim 19, comprising an actuator position feedback loop arranged to generate a motor control signal in accordance with a received actuator position signal and said actuator position demand signal.

25. A motor control system according to claim 19, further comprising an actuator synchroniser arranged to substantially synchronise the relative positions of two or more of said actuators, where the actuators are driven by respective motors wherein said actuator synchroniser is arranged to further modify said motor speed of at least one of the motors so as to keep the motions electronically synchronised.

26. A method of controlling an electric motor comprising:
   supplying drive signals to said electric motor in accordance with a predetermined motor speed profile, wherein the motor speed varies as a function of the position of an actuator driven by the motor;
   monitoring the power demand of said electric motor; and
   modifying said motor speed profile to ensure that a predetermined motor power demand is not exceeded, wherein the method further comprises generating an actuator position demand signal in accordance with the motor speed profile and using this to control the actuator position.

27. A method of controlling an electric motor according to claim 26, wherein said motor speed profile is modified by modifying said actuator position demand signal.

* * * * *